July 28, 1959 W. E. FISCHER 2,896,295
COMPONENT MOUNTING CLAMP
Filed March 28, 1957 2 Sheets-Sheet 1

INVENTOR.
WILBUR E. FISCHER
BY
ATTORNEY

July 28, 1959 W. E. FISCHER 2,896,295
COMPONENT MOUNTING CLAMP
Filed March 28, 1957 2 Sheets-Sheet 2

INVENTOR.
WILBUR E. FISCHER
BY James F. Franklin
ATTORNEY

United States Patent Office 2,896,295
Patented July 28, 1959

2,896,295

COMPONENT MOUNTING CLAMP

Wilbur E. Fischer, Freeport, N.Y.

Application March 28, 1957, Serial No. 649,235

6 Claims. (Cl. 24—263)

This invention relates to a clamp for fastening mechanical and electrical instrument components to mounting blocks and similar panels.

Mounting blocks are used to support mechanical and electrical components such as motors, generators, magnetic clutches, transformers, potentiometers and similar instruments on foundation boards. The instrument component is fastened to the mounting block by means of a number of clamps secured to the mounting block and spaced about in clamping engagement with a part of the component.

Clamps commonly in use for this purpose simply consist of a clamping member and a screw. The clamping member is rotatable about the screw over an arc principally for movement between a position for engaging and a position for releasing a mounting part of the component, such as a flange formed integrally with the component casing; and the screw, receivable in a tapped opening of the mounting block, is freely rotatable in the clamping member and is rotated with reference to the clamping member for the clamping and unclamping operation.

Clamps of this type are manipulatable with considerable inconvenience and difficulty, particularly where a number of instrument components are mounted on the mounting board in close proximity to one another, which is the situation usually met with. To fasten a clamp, the clamping member must usually first be moved by a finger manipulation to its component engaging position, and is there so held while the screw is turned down by hand to its final position for fastening the clamp. This not only requires, for many forms of clamps, the use of both hands of the operator, but where the component has a substantial axial dimension, and where a number of components are spaced closely together, inadequate room is available for finger manipulation of the fastener element, thereby rendering attachment of the component difficult. Similarly, when the clamp is moved to disengage and release the component instrument to permit its removal or replacement from the foundation board considerable inconvenience is encountered.

The prime object of my present invention centers about the provision of a clamp for fastening such mechanical and electrical components to mounting blocks and similar panels which is designed and constructed to obviate these recited difficulties. The construction of the clamp of the present invention is such that with the clamp screw located in the tapped opening of the mounting block and with the component placed in position on the mounting block, the clamp may be moved over an arc to move the clamping member thereof to a position for engaging the component, and the screw may then be rotated with reference to the clamping member until the clamp is operated to its component clamping position, and subsequently when it is desired to release the component, the screw and clamping member may be moved as a unit to a releasing position, all operations being accomplished merely by rotating the screw. Thereby the clamp may be operated to its clamping and its releasing positions solely by engaging the head of the screw with the screwdriver, all these operations being thereby capable of being effected from a screwdriver distance and without requiring the inconvenient and inaccessible finger manipulations described above and incident to the use of prior forms of clamps of this type.

To the accomplishment of these objects and such other objects as may hereinafter appear, my invention relates generically to the component mounting clamp as sought to be defined in the appended claims taken together with the following description of the invention and the accompanying drawings in which Fig. 1 is a perspective view depicting the use of the clamp of the present invention for fastening a component to a mounting block or similar panel;

Figure 1:
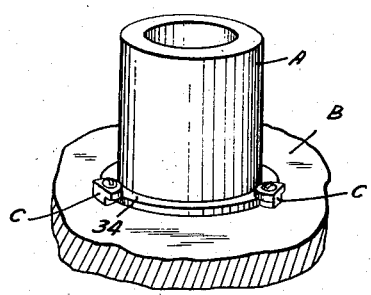

Referring now more in detail to the drawings, reference may first be had to Fig. 1 of the drawings which depicts a typical use of the clamp of the present invention. The mechanical or electrical component A is mounted on a mounting block B by means of a plurality of clamps C, C secured to the mounting block B and spaced about in clamping engagement with a mounting part of the component A. For mounting and fastening the component A in position on the mounting block B, the clamps C, C have to be moved first so that their clamping members are positioned to engage the mounting part of the component A and then have to be moved to clamping or component fastening position; and for releasing the component A for purposes of removal or replacement the clamps C, C have to be moved from their fastening condition to a releasing condition.

Figure 2:
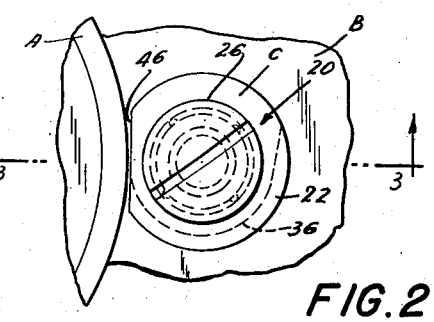
Fig. 2 is an enlarged plan view thereof showing the clamp in its non-engaging or releasing position.
Figure 3:
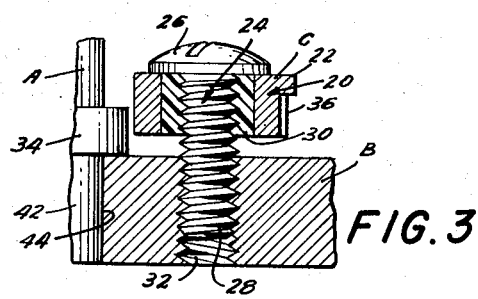
Fig. 3 is a view taken in cross section thereof in the plane of line 3—3 of Fig. 2.
Figure 4:
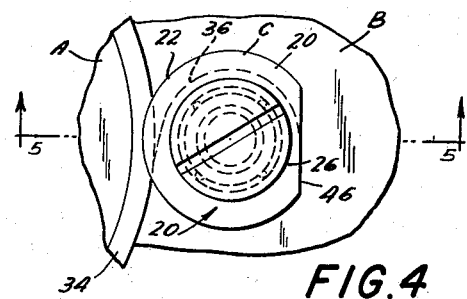
Fig. 4 is a plan view of the clamp depicting the component engaging position thereof (180° from the position shown in Fig. 2)
Figure 5:
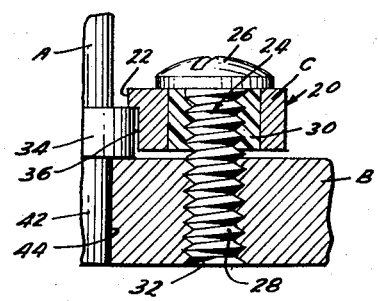
Fig. 5 is a view of Fig. 4 taken in cross section in the plane of the line 5—5 of Fig. 4 and depicting the parts in intermediate clamping condition.

To accomplish the forestated objects, the clamp C of the present invention comprises, as typically depicted in Figs. 2 to 5 of the drawings, a metal clamp member 20 rotatable over an arc such as 180° (compare Fig. 2 with Fig. 4) for moving the clamping sector 22 thereof to a position for engaging the component A (as depicted in Figs. 4 and 5), and to a component non-engaging or releasing position as depicted in Figs. 2 and 3 of the drawings, a metal screw 24 having a head 26 and a threaded shank 28, and a plastic liner 30 between the clamp member 20 and the screw 24. The plastic liner 30 is keyed to the clamp member 20 for rotation therewith and is tightly coupled threadedly to the shank 28 of the screw, the head 26 of the screw being arranged to engage the top face of the clamping member 20. The screw shank 28 is adapted to be received by a tapped opening 32 in the mounting block B. I have found that to accomplish the purposes of the invention as more particularly described hereinafter, the plastic material of the liner 30 is preferably nylon, although other plastic materials having similar functional characteristics in the combination clamp may be employed.

The clamping portion 22 of the clamp member 20 is adapted to engage, for component fastener purposes, a flange 34 formed integrally with the casing of the component A. One of the clamp members, and in the form of the invention depicted in Figs. 1 to 9 of the drawings, the clamping member 20, is provided with an abutment for engaging the component flange 34 to stop the clamp when the latter is moved to component engaging position. This abutment is preferably made by forming or shaping a part of the clamp, and in the construction shown in Figs. 1 to 9 the portion of the clamping member 20 which is below the clamping portion 22 thereof has a cammed cut away section 36 so contoured that when the clamping member 20 is moved from the position shown in Fig. 2 to that shown in Fig. 4, an end of the cut away section forms the abutment and engages the component flange 34 to stop the movement of the clamping member 20 in the position best depicted in Fig. 4 of the drawings.

Figure 9:
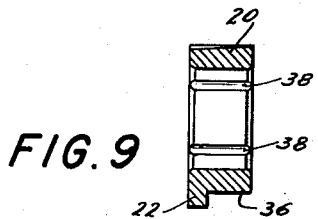
Fig. 9 is a view taken of Fig. 8 taken in cross section in the plane of the line 9—9 of Fig. 8 and showing only the clamping member of the clamp.
Figure 8:
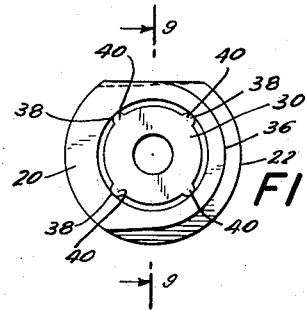
Fig. 8 is a bottom plan view of the clamp, with the screw thereof removed.
Figure 10:
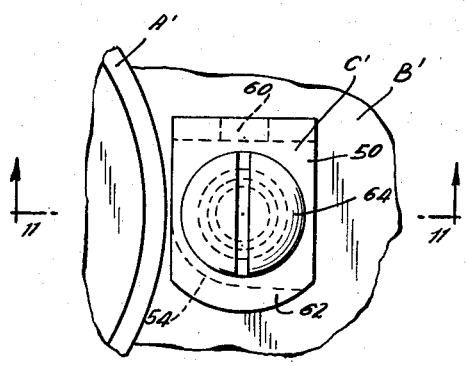
Fig. 10 is a plan view of a modification of the clamp of the invention and showing the same in its component non-engaging or releasing position.
Figure 11:
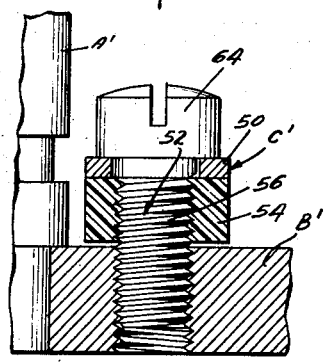
Fig. 11 is a view of Fig. 10 taken in cross section in the plane of the line 11—11 of Fig. 10.
Figure 12:
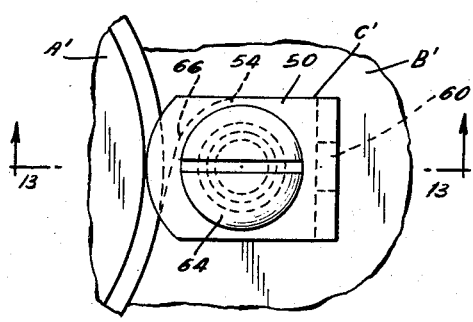
Fig. 12 is a plan view similar to Fig. 10 but showing the clamp moved to its component engaging position (90° with reference to Fig. 10)
Figure 13:
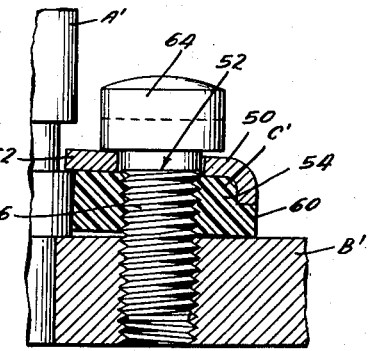
Fig. 13 is a view taken in cross section in the plane of the line 13—13 of Fig. 12 and showing the clamp in its final or "home" clamping position.

The plastic liner 30 is keyed to for rotation with the clamping member 20 in any desired fashion, as for example in the manner depicted in Figs. 8 and 9 of the drawings. The clamping member 20 is formed with axially arranged grooves 38, 38 and the plastic liner 30 is formed with corresponding ribs 40, 40 which seat in these grooves.

Figure 6:
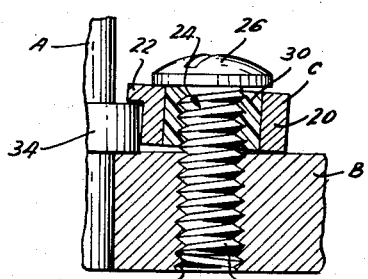
Fig. 6 is a view thereof, similar to Fig. 5, but showing the parts in finally clamped position.
Figure 7:
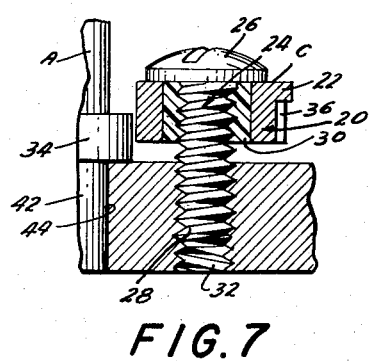
Fig. 7 is a view similar to Figs. 5 and 6 but showing the clamp moved from its component engaging to its component releasing position (compare with Fig. 2)

The functional action of the plastic liner 30 in the described clamp combination will be best understood by following the sequence of use depicting the manipulation of the clamp shown in Figs. 2 through 7 of the drawings. Figs. 2 to 6 portray the manipulation taking place during a clamping operation; and Figs. 6 and 7 depict the manipulation which takes place during a component releasing operation. The mounting block B carries the set or plurality of clamps C, C in the manner shown in Figs. 2 and 3 of the drawings. The component A is placed in position in the mounting block B with the lower part 42 of the casing thereof in a bore 44 formed in the mounting block and with the casing flange 34 in the position as typically shown in Fig. 3. To permit this, the clamps C, C are in the position shown in Figs. 2 and 3 with the flat or cut off portion 46 thereof clearing the casing flange 34. The screw head 26, carrying with it the threadedly attached liner 30 and the clamping member 20 keyed to the latter, is rotated over an arc, here 180°, so that the parts assume the position shown in Figs. 4 and 5 of the drawings. In this position the clamping member 20 is stopped, with its abutment 36 engaging the casing flange 34; the clamping portion 22 of the clamp is at this time lightly in engagement with the top of the casing flange 34 as shown in Fig. 5 of the drawings. This, however, is not the final clamping position.

It will be noted, however, that all three parts of the clamp C moved as a unit from the position shown in Figs. 2 and 3 to that shown in Figs. 4 and 5, this by mere manipulation of the head of the screw (by means of a screwdriver). The screw 24, however, is now capable of further rotation for moving the clamping member 20 axially (but without rotation) from the position shown in Fig. 5 to the position in Fig. 6, in which latter position the lower part of the clamping member 20 firmly engages the block B and the clamping portion 22 thereof most firmly engages, in final clamping position, the casing flange 34. This final operation (Fig. 5 to Fig. 6), even though the screw shank 24 is in threaded engagement with both the tapped opening 32 of the block B and the liner 30, is nevertheless capable of being accomplished, and this without effectively stripping the thread of the plastic liner because of the resilience and flowability of the plastic liner.

It will be observed in addition that it is the head of the screw 26 that nevertheless firmly contacts the metal part of the clamp so that all of the interclamped elements are metallic. The plastic liner not only enables the final clamping operation to thus take place but does so with a locking inter-engagement between the three parts of the clamp, the three parts of the clamp being held together in the final position as one unit. This latter cooperation is particularly important for the releasing movement of the clamp. For releasing the clamp it is again only necessary to operate upon the head of the screw. Upon reversed rotation of the head of the screw with the parts in position shown in Fig. 6, again no additional finger manipulation is required since the plastic liner interlocks the screw and the clamping member so that the parts move from the clamping to the unclamping position as a unit upon screw rotation. Thus, reverse or counterclockwise rotation of the screw head over a reverse arc of 180° moves the clamp from the clamping position of Fig. 6 to the unclamping or releasing position of Fig. 7 (corresponding again to Figs. 2 and 3).

Figure 14:
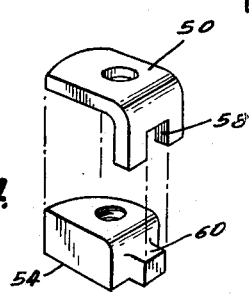
Fig. 14 is a perspective view of two parts of this modified clamp construction.

In Figs. 10 to 14 I show a modified structure of the clamp of the present invention. In this modification the clamp C', employed for clamping the component A' on a mounting block B', comprises a metal clamping member 50, a screw 52 and an intermediate plastic element 54 keyed to for rotation with the clamping member 50 and tightly coupled threadedly to the shank 56 of the screw 52. In this form of the invention the clamping member 50 is L-shaped (as best shown in Fig. 14), is provided with a recess or opening 58 in its down-turned portion; and the plastic element 54 is in the form of a block which is received within the crook of the L-shaped clamping member, the plastic element being formed with a lug 60 which is received by the recess or opening 58, thereby keying the clamping member and the plastic element together. The rectangular shape of the top of the clamping member 50 provides the clamping portion 62. The head 64 of the screw over-rides and engages the top of the clamping member 50.

In this modified form of the invention, the stop abutment is formed by suitably shaping the plastic element of the combination. Thus, the end of the plastic element 54 opposite the lug 60 is cut away at 66 in cam form (see particularly Figs. 12 and 14) to form the stop abutment.

The association between the clamping member 50, the screw 52, and the plastic element 54 in this modified form of the invention is such as to permit the same operations as heretofore described in connection with the clamp of Figs. 1 to 9; and this is illustrated by Figs. 10 to 13 of the drawings. In the non-clamping condition, the clamp C' is in the position shown in Figs. 10 and 11. When the screw head is rotated over an arc of 90° from this position to that shown in Figs. 12 and 13 all three parts of the clamp move as a unit by dint of the tight threaded engagement between the screw and the plastic element and the keying between the latter and the clamping member. When moved to this latter position, the plastic element 54, and with it the clamping member 50, is stopped in the component engaging position by the abutment 66 formed in the plastic element. The clamping member, however, is not as yet in its final clamping condition. The screw head 64 is given a further rotation until the clamping member 50 is forced axially (without being rotated) to its final home or clamping position best shown in Fig. 13. In this position, the three parts of the clamp are so united that upon a reverse rotation of the clamp over an arc of 90° to the clamp releasing position all three parts of the clamp move as a unit. Thereby all intended or required operations of the clamp may be effected at long range by means of a screwdriver and without use of any finger manipulations incident to clamps known heretofore.

The structure, operation, uses and advantages of the clamp of the present invention will it is believed be fully apparent from the above detailed description thereof. It will be further apparent that changes may be made in the structure or design of the parts without departing from the principle of the invention as defined in the following claims.

I claim:

1. A component mounting clamp for clamping a flanged component onto a mounting block comprising a rotatable clamp member provided with a clamping sector, said clamp member being rotatable over an arc for moving the clamping sector to a position for engaging and to a position for releasing the flange of the component which is to be fastened to a mounting block, a screw having a head and a threaded shank, and a plastic element between the clamp member and the screw, said plastic element being keyed to the clamp member for rotation therewith and being tightly threadedly coupled to the shank of the screw, the head of the screw being arranged to engage the clamping member, the screw shank being adapted to be received by a tapped opening in said mounting block, whereby actuation of the screw in opposite rotative directions in said tapped opening will serve to rotate the plastic element and clamp member together between said engaging and releasing positions, and whereby continued rotation of the screw with its head engaging the clamping member and with the clamping sector in its component flange engaging position is permitted to effect a forced fastening of the component flange to the mounting block.

2. The component mounting clamp of claim 1 in which the plastic element is made of nylon.

3. A component mounting clamp for clamping a flanged component onto a mounting block comprising a rotatable metal clamp member provided with a clamping sector, said clamp member being rotatable over an arc for moving the clamping sector to a position for engaging and to a position for releasing the flange of the component which is to be fastened to a mounting block, a metal screw having a head and a threaded shank, and a plastic member between the clamp member and the screw, said plastic member being keyed to the clamp member for rotation therewith and being tightly threadedly coupled to the shank of the screw, one of said members having an abutment for engaging the component to stop the clamp in its component engaging position, the head of the screw being arranged to engage the clamping member, the screw shank being adapted to be received by a tapped opening in said mounting block, whereby actuation of the screw in opposite rotative directions in said tapped opening will serve to rotate the plastic member and clamp member together between said engaging and releasing positions, and whereby continued rotation of the screw with its head engaging the clamping member and with the clamping sector in its component flange engaging position is permitted to effect a forced fastening of the component flange to the mounting block.

4. A component mounting clamp for clamping a flanged component onto a mounting block comprising a rotatable metal clamp member provided with a clamping sector, said clamp member being rotatable over an arc for moving the clamping sector to a position for engaging and to a position for releasing the flange of the component which is to be fastened to a mounting block, a metal screw having a head and a threaded shank, and a plastic element between the clamp member and the screw, said plastic element being keyed to the clamp member for rotation therewith and being tightly threadedly coupled to the shank of the screw, the clamp member being shaped to provide an abutment for engaging the component to stop the clamp in said component engaging position, the head of the screw being arranged to engage the clamping member, the screw shank being adapted to be received by a tapped opening in said mounting block, whereby actuation of the screw in opposite rotative directions in said tapped opening will serve to rotate the plastic element and clamp member together between said engaging and releasing positions, and whereby continued rotation of the screw with its head engaging the clamping member and with the clamping sector in its component flange engaging position is permitted to effect a forced fastening of the component flange to the mounting block.

5. The component mounting clamp of claim 4 in which the plastic element is made of nylon.

6. A component mounting clamp for clamping a flanged component onto a mounting block comprising a flat substantially circular metal clamp member having a flat side face and having a cammed cut away section at its lower peripheral edge extending part way around the periphery from said flat side face, ending in a cammed surface, said clamp member having an aperture therethrough, a plastic element in said aperture keyed to the clamp member, a screw extending through said aperture having a head adapted to engage the clamping member and having a shank threadedly coupled to said plastic element.

No references cited.